Sept. 1, 1953  R. DORAND ET AL  2,650,666
ROTARY-WING AIRCRAFT WITH JET-DRIVEN ROTOR
Filed July 16, 1947  2 Sheets-Sheet 1

INVENTORS:
RENE DORAND AND PAUL GABRIET
BY:

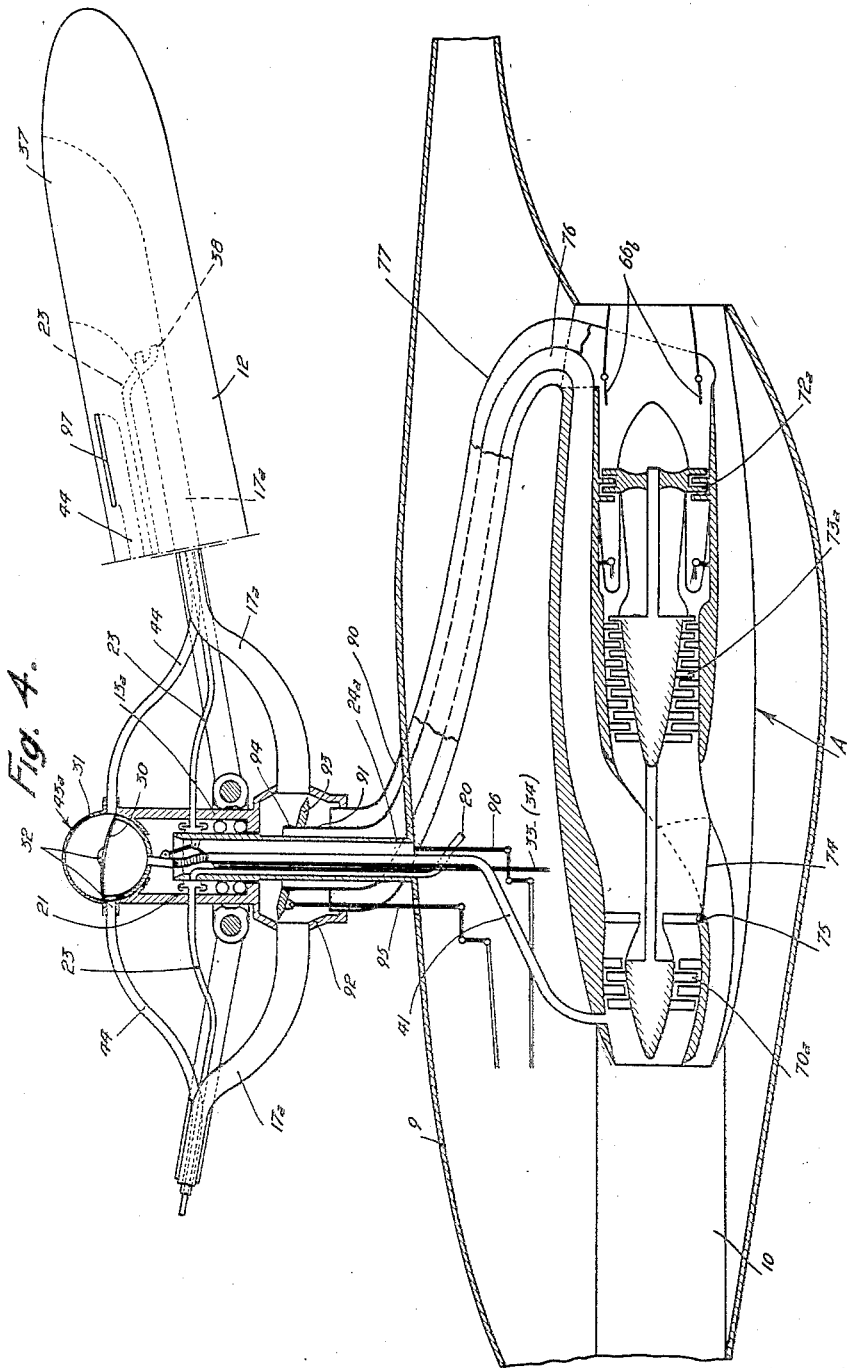

Patented Sept. 1, 1953

2,650,666

UNITED STATES PATENT OFFICE 2,650,666

ROTARY-WING AIRCRAFT WITH JET-DRIVEN ROTOR

René Dorand, Versailles, and Paul Gabriel, Boulogne-Billancourt, France, assignors, by mesne assignments, to René Dorand, Versailles, France Application July 16, 1947, Serial No. 761,208
In France July 25, 1946

19 Claims. (Cl. 170—135.4)

There are known rotary-wing aircraft wherein a compressor, a blower or a turbo-jet engine mounted on the craft feeds, with compressed fluid, jet units located at the ends of the rotor blades in order to rotate the lifting rotor (rotary-wing).

When the jet units of the blades are fed with the gas from a turbo-jet engine mounted on the craft, it is essential to convey to the blade jet units the greatest part of the burned gas produced by the jet engine. However, the high temperature of the burned gas damage the rotor blade. It is thus necessary to reduce the temperature of said gas in order to protect the material of the blades.

In order that the rotary-wing operate with the utmost efficiency, it is essential that, beside its lifting effect, the rotary-wing assume as far as possible, only its own translational propulsion, on translational flight of the craft; in other words, it is of advantage that the craftbody ensures its own translational propulsion by means of an energy which is not conveyed to the jet units of the rotor blades.

Experience also shows that it is convenient to withdraw the rotor blades from alternate strains, at least in the plane of rotation of the blades, during the translational flying of the craft.

The present invention aims to provide some improvements to rotary-wing aircraft so to ensure the above-mentioned results and to increase the general efficiency of the craft.

One object of the invention is to provide for the feeding of jet units located at the ends of the rotor blades by means of gas, having a moderate temperature and constituted by an air and hot gas mixture, taken from a jet engine (such as a turbo-jet powerplant) secured to the craft body, said jet engine comprising an exhaust nozzle the gas-jet of which insures the translational flying of the craft.

The use, for the jet-units of the rotor blades, of an air and hot gas mixture supplied by the jet engine of the craft, has the advantage of making the temperature and the pressure of the gaseous mixture suitable for the strength of the materials of the blades.

Another object of the invention is to provide for a cyclic variation of the blade operation, during the translational flying of the craft, in order to balance cyclically the blade draft, which itself varies cyclically in step with the rotation of the rotor blades, and to reduce substantially the alternate strains on said blades.

Such cyclic variation of the blade operation may be obtained by means which provide for a cyclic variation (in step with the rotation of the blades) of the blade jet unit operation, the latter variation being adjusted to correspond with the cyclic variation of the blade drag.

The cyclic variation of the reaction jet of each blade may be obtained by means of a cyclic variation of the exhaust section of the nozzle of each blade jet unit.

It is also possible to cyclically provide for a variation of operation of the blade jet units by means of a distributor which cyclically varies either the delivery of the gas supplied to each blade jet unit or the proportion of the air and hot ga smixture fed to the jet units by the craft jet powerplant.

A further object of the invention is to provide for the suction of the blade boundary layer by means of a depression at the air intake in the entrance of the craft jet engine.

Preferably, the boundary layer suction takes place cyclically, in accordance with the cyclically varying positions of the blades during the rotation thereof, by means of a distributor which, in step with the rotation of the lifting rotor, cyclically controls the section of ducts connecting suction ports of the blades with the inlet of the craft jet engine.

The suction produces, in the rotor blades, a centripetal air flow and imparts a driving torque to the rotor. Moreover, the air sucked by the diffuser into the suction ports of the blades reduces the air directly taken by said diffuser in the atmosphere.

The cyclic variation of the boundary layer suction gives results that are comparable with the cyclic variations of the blade incidence and improves the control and the piloting of the craft.

Other special features and characteristics of the invention will appear in the following specification which describes some examples of execution of the present invention illustrated diagrammatically in the accompanying drawings, in which:

Fig. 4 shows a general arrangement comprising a power plant mounted in the fuselage of a helicopter, a fluid distributor, a fuel distributor, a distributor for sucking the boundary layer of air, and a blade.

Figure 1:
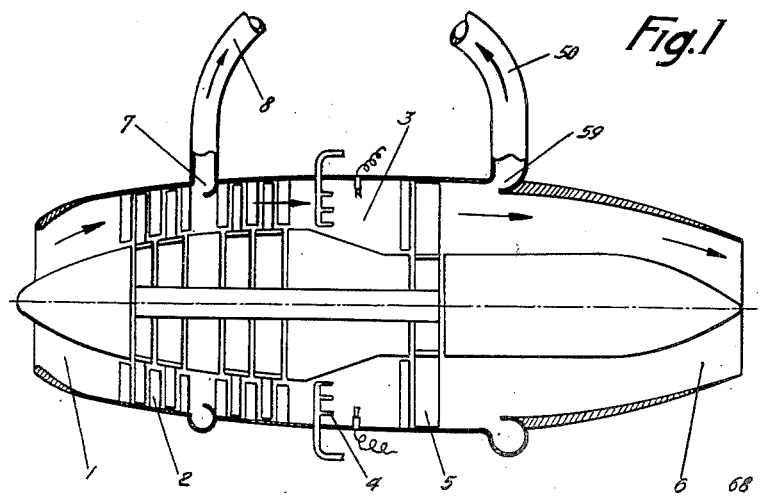
Fig. 1 illustrates in axial section a turbo-jet engine with outlets for air and gas.

The turbo-jet engine illustrated in Fig. 1 comprises an entrance diffuser 1, a multi-stage compressor 2 which delivers the compressed air to a firebox 3 where the combustion of the fuel admitted through burners 4 takes place.

The burned gases pass through the blading of a gas turbine 5 coupled to compressor 2 and effect expansion in the exhaust nozzle 6 from which the jet escapes to insure the reaction. The compressor 2 comprises, at a suitable compression stage, an outlet 7 that brings compressed air into the air duct 8. Downstream the turbine 5 is provided with an outlet 59 for combustion gases delivered into a duct 58.

Figure 2:
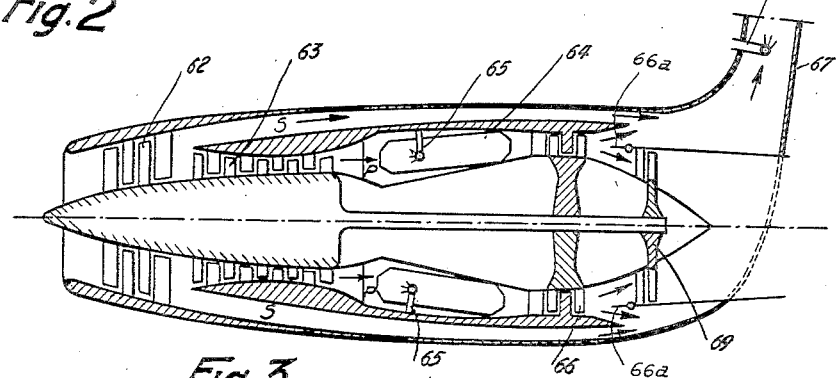
Fig. 2 is a longitudinal section of a turbo-jet engine for the jet flying of a rotary wing aircraft.

In Fig. 2, which illustrates a turbo-jet engine for the propulsion of a helicopter, an air flow at low pressure S is supplied by the compressor 62 while an air flow at high pressure P is supplied by the compressor 62 and a high pressure compressor 63 that sends the air flow P into the combustion chamber 64 where the burners 65 are located, the combustion gases expanding in the turbine 66 at the outlet of which they are at a pressure substantially equal to that of the flow S, which allows the mixing of this latter flow with a portion of the hot burned gases and the delivery of the mixture into the blades, through the duct 67 in which may be located an overpower arrangement formed by a burner 68. The amount of burned gases mixed with the air flow may be controlled by valves 66a.

The second portion of the hot gases is expanded in an auxiliary turbine 69 and finally gives a certain thrust of direct reaction.

Figure 3:
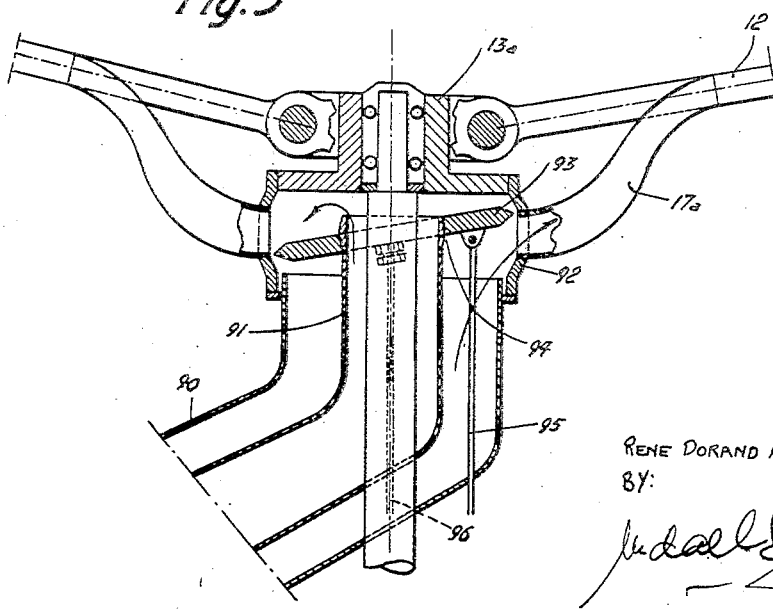
Fig. 3 is a section of a distributor ensuring a cyclic temperature variation of the gases (air and burned gas) delivered to the blade jet units.

The cyclic variation of the temperature of the gaseous fluid in the blades, a cyclic variation which produces the cyclic variation of the rotor blade driving torque, may be obtained by a cyclic variation of the proportions of mixture of fresh air and hot gases and this latter variation may be obtained by the distributor illustrated in Fig. 3.

The hot gases are brought to this distributor through a duct 90, and the fresh air through an inner coaxial duct 91. The body 92 of the distributor revolves with hub 13a of the rotor and the flexible pipe 17a brings the mixture of gaseous fluid to the jet unit of the blade 12. In the body 92 is a non-rotating butterfly throttle 93 mounted on the ball joint 94 and controlled by rods 95 and 96 set off (circumferentially) at 90° in relation to each other, which allows the butterfly to assume all useful positions around the above-mentioned ball joint.

This arrangement also produces, in accordance with the positions given to the control rods, a mixture the temperature of which varies in intensity and in phase as a function of the horizontal angle of the blades.

In Fig. 4 there is illustrated a general arrangement comprising a power plant, a fluid distributor, a fuel distributor, a distributor for sucking the boundary layer of air, and a blade construction, the power plant being mounted in the fuselage of a helicopter.

As is shown in Fig. 4, the engine unit A is mounted in the fuselage 9 of the aircraft and is supplied with air through the inlet channel 10. The engine unit A comprises the compressor 73a, and the gas turbine 72a drives a compressor 70a. The air from the compressor 70a may be delivered wholly to the blades of the rotor or partly to these blades and partly to the compressor 73a, which supplies the gas turbine 72a, by means of the movable shutter 74 which is pivotally mounted at 75. The compressed air is conveyed to the rotor blades through the duct 76 which is surrounded by a duct 77 which is capable of delivering to the blades a portion of the burned gases drawn off on the downstream side of the gas turbine 72a, the amount of hot gases entering duct 77 being controlled by the valves 66b.

Duct portion 90 forms an extension of duct 77 and surrounds duct portion 91 which forms an extension of duct 76, the two duct portions 90 and 91 terminating within a distributor having a body 92 which is fixedly connected to the hub 13a of the rotor so as to be rotatable therewith. Flexible pipes 17a communicate with the distributor body 92 and with the jet units 37, respectively, to deliver the mixture of gaseous fluid from the distributor to the jet units 37 located in the blades 12 and each having a burner 38 located therein. The burners 38 are supplied through the pipes 23 which communicate with the fuel distributor 21, this fuel distributor 21 having a fixed part secured to the hollow pivot axis 24a which is fixedly mounted on the fuselage 9 and which rotatably supports the hub 13a. A pipe 20 extends along the interior of the hollow pivot axis 24a and communicates with the distributor 21 to supply fuel thereto.

As was described above in connection with Fig. 3, a non-rotating, butterfly throttle valve 93 is located within the revolving distributor body 92 and is mounted on a ball joint 94 located at the upper end of duct portion 91 so that the throttle 93 may be tilted and controlled by the rods 95 and 96 linked to the throttle 93 at points located at 90° from each other about the axis of pivot 24a so that the butterfly throttle valve 93 may be set by rods 95 and 96 to any desired position on the ball joint 94.

With this arrangement it is possible, in accordance with settings of valve 93 determined by rods 95 and 96, to produce a gaseous mixture having a temperature which varies in intensity and in phase, as a function of the horizontal angle of the blades with respect to the longitudinal axis of fuselage 9.

A distributor 43a is located at the upper end of hub 13a and serves to produce a cyclic suction of the boundary air layer of the rotor blades. This distributor 43a comprises a spherical body 31 fixedly connected to the hub 13a for rotation therewith and having the pipes 44 communicating with the interior thereof at the openings 32, these pipes 44 being respectively connected to the suction ports 97 of the blades 12. Within the spherical body there is mounted a non-rotating substantially hemispherical member 30 which communicates, through the merium of duct 41, with the inlet of compressor 70a. This non-revolving member 30 is turnable within the distributor 31 and may slope in all directions so that the member 30, in a sloped position thereof, may alternately cover and uncover the openings 32 to which ducts 44 lead. As a result of the rotation of distributor 31 with respect to member 30, the covering and uncovering of openings 32 becomes cyclical (in synchronism with the rotation of the rotor blades) and this covering and uncovering of the openings 32 is controlled by the position of member 30. The sloping of member 30 is controlled through the medium of the rod systems 33 (34).

What we claim is:

1. In a helicopter having a body, a lifting rotor positioned for rotation above said body and having blades, jet units secured to said blades for rotating the lifting rotor, a jet engine carried by said body and a feeding duct system fed by the said jet engine with pressure gas and connected to said blade jet units to convey thereto the pressure gas from said jet engine, said jet engine comprising an entrance diffuser, a multi-stage air compressor located downstream said diffuser for compressing the air which passes said diffuser, at least one combustion chamber in communication with and fed by said compressor, a gas turbine in communication with and fed by said chamber and operatively connected to the compresser for driving the latter and an exhaust nozzle allowing the escapement into the atmosphere of burned gas leaving the turbine, an outlet in the pressure zone of the compressor for drawing off a portion of the compressed air, an outlet downstream the combustion chamber for drawing off a portion of the burned gas, said outlets being connected to the feeding duct system.

2. A helicopter as in claim 1, wherein the outlet for compressed air lies between the inlet and the outlet of the compressor.

3. A helicopter as in claim 1, wherein the outlet for burned gas lies at the outlet of the gas turbine.

4. A helicopter as in claim 1, wherein the outlet for compressed air lies at the outlet of the compressor.

5. In a helicopter having a body, a lifting rotor positioned for rotation above said body and having blades, jet units secured to said blades for rotating the lifting rotor, a jet engine carried by said body and a feeding duct system connected to said jet engine to be fed by the latter with pressure gas and connected to said blade jet units to convey thereto the pressure gas from said jet engine, said engine comprising an entrance diffuser, a low pressure compressor fed by said diffuser, an outlet downstream said compressor for drawing off a portion of the compressed air said outlet being connected to the feeding duct system, a high pressure compressor downstream the low pressure compressor in order to be fed by the latter, at least one combustion chamber in communication with and fed by said high pressure compressor, a gas turbine in communication with and fed by said chamber and operatively connected to the two compressors for driving the latter, an outlet downstream said turbine for drawing off a portion of the burned gas, said outlet being connected to the feeding duct system, a low pressure gas turbine operatively connected to the first one and downstream the latter, an exhaust nozzle allowing the escapement into the atmosphere of burned gas leaving the two turbines and means for controlling the passageway of at least one of said outlets in order to vary the proportion of the compressed air and hot gas mixture passing the feeding duct system.

6. In a helicopter having a rotary wing, said wing including lifting blades rotating on a pivot and each provided with a passageway extending along the blades length and in communication with the atmosphere through the blade wall, the provision of a distributor for the delivery to said pasageway of a mixture of gases having different temperatures and for cyclically varying the temperature of said mixture in dependence on the angular position of the blades during each revolution of the wing, said distributor comprising a casing with radially disposed outlet ports each connected to a blade passageway, two coaxially arranged ducts lying in the axis of said casing and entering in the latter and a non-rotating but rocking member arranged on the axial duct and having its periphery at short range from the inner cylindrical wall of the casing.

7. In a helicopter having a rotary wing, said wing including lifting blades rotating on a pivot and each provided with a passageway extending along the blade length and in communication with the atmosphere through the blade wall, the provision of a distributor for the delivery to said passageway of a mixture of two gases having different temperatures and for the cyclic variation of the temperature of said mixture in dependence on the angular position of the blades during each revolution of the wing, said distributor comprising a hub to which are secured the blades, a circular wall portion forming one piece with said hub, delimiting a round cavity and having radial outlet ports connected to the blade passageways, a motionless duct of large diameter arranged in the axis of the hub and engaged in the lower edge of said circular wall for the delivery of one of the two gases in said cavity, a motionless duct of smaller diameter arranged in the axis of the first one and the upper edge of which entering the said cavity for the delivery of the other gas to the cavity, an external spherical joint part arranged at the upper edge of the duct of smaller diameter, a non-rotating rocking disc for dividing said cavity in two compartments, arranged to rock on said spherical joint part and to make said outlet ports communicate with said compartments and control means for causing said disc to rock, so that the said outlet ports are fed with a gas mixture the temperature of which adjustably varies in step with the rotation of the wing.

8. A helicopter, comprising, in combination, a helicopter body; a lifting rotor mounted for rotation above said body and having a plurality of blades, said blades having a plurality of suction ports located on each of said rotor blades in their exterior surfaces for sucking in the boundary layer of air at said rotor blades; a plurality of jet units respectively mounted in said blades for propelling the same; a jet engine mounted on said body; first duct means communicating with said suction ports and a low pressure region in said jet engine for leading the layer of air sucked in at said blades to said jet engine; and second duct means communicating with said jet units and at least one high pressure region of said jet engine for leading compressed air and hot gases from said jet engine to said jet units.

9. A helicopter, comprising, in combination, a helicopter body; a lifting rotor mounted for rotation above said body and having a plurality of blades, said blades having a plurality of suction ports located on each of said rotor blades in their exterior surface for sucking in the boundary layer of air at said rotor blades; a plurality of jet units respectively mounted in said blades for propelling the same; a jet engine mounted on said body and having a multi-stage air compressor; first duct means communicating with said suction ports and a low pressure region in said jet engine on the upstream side of said compressor for leading the layer of air sucked in at said blades to said jet engine; and second duct means communicating with said jet units and at least one high pressure region of said jet engine for leading compressed air and hot gases from said jet engine to said jet units, said second duct means communicating with the downstream side of said compressor.

10. A helicopter, comprising, in combination, a helicopter body; a lifting rotor mounted for rotation above said body and having a plurality of blades, said blades having a plurality of suction ports located on each of said rotor blades in their exterior surface for sucking in the boundary layer of air at said rotor blades; a plurality of jet units respectively mounted in said blades for propelling the same; a jet engine mounted on said body and having a multi-stage air compressor; first duct means communicating with said suction ports and a low pressure region in said jet engine on the upstream side of said compressor for leading the layer of air sucked in at said blades to said jet engine; and second duct means communicating with said jet units and at least one high pressure region of said jet engine for leading compressed air and hot gases from said jet engine to said jet units, said second duct means communicating with the downstream side of said compressor and comprising a first duct system for leading compressed air from said jet engine to said jet units and a second duct system for leading hot gases from said jet engine to said jet units.

11. A helicopter, comprising, in combination, a helicopter body; a lifting rotor mounted for rotation above said body and having a plurality of blades, said blades having a plurality of suction ports located on each of said rotor blades in their exterior surface for sucking in the boundary layer of air at said rotor blades; a plurality of jet units respectively mounted in said blades for propelling the same; a jet engine mounted on said body and having a multi-stage air compressor; first duct means communicating with said suction ports and a low pressure region in said jet engine on the upstream side of said compressor for leading the layer of air sucked in at said blades to said jet engine; second duct means communicating with said jet units and at least one high pressure region of said jet engine for leading compressed air and hot gases from said jet engine to said jet units, said second duct means communicating with the downstream side of said compressor and comprising a first duct system for leading compressed air from said jet engine to said jet units and a second duct system for leading hot gases from said jet engine to said jet units; and distributor means located at the hub of said rotor and communicating with said first and second duct means for controlling the flow of the gases between said rotor blades and said jet engine.

12. A helicopter, comprising, in combination, a helicopter body; a rotor mounted for rotation above said body and having a plurality of blades, said blades having a plurality of suction ports formed in each of said rotor blades in their exterior surface for sucking in the boundary layer of air at said blades; a jet engine mounted on said helicopter body; and a duct system communicating with said suction ports and a low pressure region in said jet engine for leading the air sucked in at said rotor blades to said jet engine.

13. In a helicopter having a body, a lifting rotor positioned for rotation above said body and having blades, jet units secured to said blades for rotating the lifting rotor, a jet engine carried by said body and comprising a compressor, at least one combustion chamber and a gas turbine, and a feeding duct system connected to said engine to be fed by the latter with pressure gas and connected to said blade jet units to convey thereto the pressure gas from said jet engine, the provision of a duct connection for connecting said duct system to the jet engine and including a compressed air outlet and a burned gas outlet both for feeding the blade jet units with a mixture of air and hot gas and control means in the connection of said duct system to the body jet engine for varying the proportions of the air and hot gas of said mixture.

14. In a helicopter having a body, a lifting rotor positioned for rotation above said body and having blades, jet units secured to said blades for rotating the lifting rotor, a jet engine carried by said body and comprising a compressor, at least one combustion chamber and a gas turbine, and a feeding duct system connected to said engine to be fed by the latter with pressure gas and connected to said blade jet units to convey thereto the pressure gas from said jet engine, the provision of a duct connection for connecting said duct system to the jet engine and including a compressed air outlet and a burned gas outlet both for feeding the blade jet units with a mixture of air and hot gas and control means in at least one of said outlets for varying the proportions of the air and hot gas of said mixture.

15. In a helicopter having a body, a lifting rotor positioned for rotation above said body and having blades, jet units secured to said blades for rotating the lifting rotor, a jet engine carried by said body and comprising a compressor, at least one combustion chamber and a gas turbine, and a feeding duct system connected to said engine to be fed by the latter with pressure gas and connected to said blade jet units to convey thereto the pressure gas from said jet engine, the provision of a duct connection for connecting said duct system to the jet engine and including a compressed air outlet and a burned gas outlet both for feeding the blade jet units with a mixture of air and hot gas and control means in the hot gas outlet for varying the proportions of the air and hot gas of said mixture.

16. A helicopter as defined in claim 8 and further comprising a distributor means located in said first duct means for cyclically varying the boundary layer suction in accordance with the angular position of said rotor blades during each revolution thereof.

17. A helicopter as defined in claim 16 and wherein said distributor means comprises a spherical casing formed with intake ports communicating with said first duct means; a hollow substantially hemispherical member mounted in said spherical casing for movement with respect thereto and being located against the inner wall of said casing, said hemispherical member being formed with an opening connected to a part of said first duct means leading to said low pressure region of said jet engine so that the layer of air sucked in at said blades passes through said intake ports into the interior of said spherical body and hemispherical member and from the latter through said part of said first duct means leading to said low pressure region of said jet engine; and tilting means operatively connected to said hemispherical member for tilting the same in said spherical body so that said hemispherical member covers a part of said intake ports.

18. A helicopter as defined in claim 12, and wherein a valve means is mounted in said duct means for cyclically controlling the air suction in accordance with the rotation of said rotor.

19. A helicopter, comprising, in combination, a helicopter body; a rotor mounted for rotation above said body and having a plurality of blades, said blades having a plurality of suction ports formed in their exterior surfaces for sucking in the boundary layer of air at said blades; power means operatively connected to said rotor for rotating the same and having low pressure region; duct means communicating with said suction ports and said low pressure region of said power means; and valve means mounted in said duct means for cyclically controlling the flow of air through said duct means.

RENÉ DORAND.
PAUL GABRIET.

References Cited in the file of this patent

UNITED STATES PATENTS

| Number | Name | Date |
|---|---|---|
| 506,059 | Mitchell | Oct. 3, 1893 |
| 1,971,734 | Stalker | Aug. 28, 1934 |
| 1,982,969 | Stalker | Dec. 4, 1934 |
| 2,041,796 | Stalker | May 26, 1936 |
| 2,084,464 | Stalker | June 22, 1937 |
| 2,085,761 | Lysholm | July 6, 1937 |
| 2,092,077 | Knight et al. | Sept. 7, 1937 |
| 2,164,721 | Price | July 4, 1939 |
| 2,280,835 | Lysholm | Apr. 28, 1942 |
| 2,330,056 | Howard | Sept. 21, 1943 |
| 2,356,557 | Anxionnaz | Aug. 22, 1944 |
| 2,396,911 | Anxionnaz | Mar. 19, 1946 |
| 2,397,357 | Kundig | Mar. 26, 1946 |
| 2,409,177 | Allen | Oct. 15, 1946 |
| 2,411,227 | Planoil et al. | Nov. 19, 1946 |
| 2,421,518 | Molloy | June 3, 1947 |
| 2,429,646 | Pullin | Oct. 28, 1947 |
| 2,433,251 | Whiting | Dec. 23, 1947 |
| 2,441,488 | Howell | May 11, 1948 |
| 2,443,717 | Birmann | June 22, 1948 |
| 2,457,936 | Stalker | Jan. 1, 1949 |
| 2,464,651 | Pecker | Mar. 15, 1949 |

FOREIGN PATENTS

| Number | Country | Date |
|---|---|---|
| 227,151 | Great Britain | Jan. 12, 1925 |
| 366,450 | Great Britain | of 1930 |
| 522,163 | France | Mar. 22, 1921 |
| 556,866 | Great Britain | Oct. 26, 1943 |

OTHER REFERENCES

Smith: "Gas Turbines and Jet Propulsion," page 38; New York, 1944.